United States Patent
White et al.

(10) Patent No.: US 10,846,045 B2
(45) Date of Patent: Nov. 24, 2020

(54) CONTENT BASED DYNAMIC AUDIO SETTINGS

(71) Applicant: BOSE CORPORATION, Framingham, MA (US)

(72) Inventors: Brian Robert White, Hudson, MA (US); Trevor Irving Lai, Wayland, MA (US); Sisi Sun, Ashland, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/903,366

(22) Filed: Feb. 23, 2018

(65) Prior Publication Data

US 2019/0265943 A1    Aug. 29, 2019

(51) Int. Cl.
| | |
|---|---|
| G06F 3/16 | (2006.01) |
| G06F 16/68 | (2019.01) |
| H04S 7/00 | (2006.01) |
| G11B 27/10 | (2006.01) |
| G11B 27/28 | (2006.01) |
| H04H 60/13 | (2008.01) |
| H04R 5/04 | (2006.01) |
| H04H 60/74 | (2008.01) |
| H04H 60/47 | (2008.01) |

(52) U.S. Cl.
CPC ............ *G06F 3/165* (2013.01); *G06F 16/686* (2019.01); *G11B 27/105* (2013.01); *G11B 27/28* (2013.01); *H04H 60/13* (2013.01); *H04R 5/04* (2013.01); *H04S 7/307* (2013.01); *H04H 60/47* (2013.01); *H04H 60/74* (2013.01); *H04R 2499/13* (2013.01)

(58) Field of Classification Search
CPC ..... G06F 3/165; G06F 16/686; H03G 3/3089; H04H 20/106; H04H 60/13; H04H 60/47; H04H 60/74; H04R 5/04; H04R 2430/01; H04R 2499/13; H04L 12/2805; H04L 12/2838; H04L 2012/2849; H04S 7/307; G11B 27/105; G11B 27/28
See application file for complete search history.

(56) References Cited

U.S. PATENT DOCUMENTS

| | | | |
|---|---|---|---|
| 6,870,940 B2 * | 3/2005 | Meyer .................. | H04R 25/558 |
| | | | 381/23.1 |
| 9,578,436 B2 | 2/2017 | Scheirer et al. | |
| (Continued) | | | |

FOREIGN PATENT DOCUMENTS

| | | | | |
|---|---|---|---|---|
| DE | 19848491 A1 | 4/2000 | | |
| EP | 0064042 B1 * | 1/1986 | ............. | H04R 25/00 |
| (Continued) | | | | |

OTHER PUBLICATIONS

International Search Report and the Written Opinion of the International Searching Authority from corresponding PCT/US2019/018908 dated May 17, 2019.

*Primary Examiner* — Fan S Tsang
*Assistant Examiner* — David Siegel
(74) *Attorney, Agent, or Firm* — Lando & Anastasi, LLP (57) ABSTRACT

Audio processing systems and methods are configured to receive audio program content and to reproduce the audio program content in accord with at least one audio parameter. The audio parameter is stored with a relation to an identifier associated with the audio program content. The audio parameter may be later retrieved for reproduction of associated audio program content.

17 Claims, 6 Drawing Sheets

(56) References Cited

U.S. PATENT DOCUMENTS

| | | | |
|---|---|---|---|
| 10,140,083 B1* | 11/2018 | Nguyen | G06F 3/165 |
| 2007/0026841 A1 | 2/2007 | DeMoor | |
| 2010/0303445 A1* | 12/2010 | Maegaki | H04N 5/775 |
| | | | 386/248 |
| 2013/0272553 A1* | 10/2013 | Meier | H04R 25/43 |
| | | | 381/312 |
| 2015/0237454 A1* | 8/2015 | Scheirer | H04S 7/30 |
| | | | 381/17 |
| 2018/0124524 A1* | 5/2018 | Bhat | H03F 3/183 |

FOREIGN PATENT DOCUMENTS

| | | |
|---|---|---|
| EP | 1631120 A2 | 3/2006 |
| WO | 2016014647 A1 | 1/2016 |

* cited by examiner

CONTENT BASED DYNAMIC AUDIO SETTINGS

BACKGROUND

Devices for the reproduction of audio signals, such as music, sports, television, talk, etc. often include various audio settings, including user selectable settings such as tone control, equalization, etc., and custom processing such as spatial or dialog enhancement, for instance. Such audio settings, functions, and processing may be changed by a user, and may be more suitable for a particular type of audio program than another.

SUMMARY

Systems and methods disclosed herein are directed to audio systems and methods that store audio reproduction parameters in association with one or more identifying parameters of audio content, and when the same or similar audio content is played, the audio systems and methods may retrieve the stored audio reproduction parameters for use in rendering the audio content. For example, audio reproduction parameters may include items such as equalization settings, custom modes, delay and level offset values, etc., while identifying parameters of audio content may include items such as input interface, genre (music, movie), playlist, program type (sporting event, talk show, movie), etc.

According to one aspect, an audio processing system is provided that includes at least one audio input configured to receive audio program content, a controller configured to store an audio parameter related to the audio program content, to assign an identifier to the audio program content, and to associate the stored audio parameter with the identifier, and an audio transducer configured to convert an audio signal into an acoustic signal, the audio signal being derived from the audio program content in accord with the audio parameter.

In some examples, the controller is further configured to use the identifier to retrieve the stored audio parameter.

In certain examples, the controller is configured to detect the at least one audio input, and assign the identifier to the audio program content based upon the at least one audio input.

According to some examples, the controller is configured to detect metadata associated with the audio program content, and to assign the identifier based upon the metadata. The metadata may include any of a playlist title, a station title, a program title, a genre, an album title, an artist title, a song title, a track name, a track number, a chapter name, a chapter number, and/or a file name. In certain examples, the controller is configured to extract the metadata from a channel of the audio program content. In some examples, the metadata is provided by a source of the audio program content. In some examples, the controller may be configured to detect the metadata at least in part through analysis of the audio program content.

In certain examples, the at least one audio parameter is at least one of an equalization parameter, a delay parameter, a sound level parameter, or a processing mode parameter.

In some examples, the controller is further configured to associate a user identity with the identifier.

According to another aspect, a speaker system is provided that includes a plurality of selectable inputs configured to receive audio content, a processor configured to process the audio content according to at least one audio setting and configured to assign an identifier to the audio content, an amplifier configured to amplify the processed audio content and to provide an amplified audio signal, an acoustic transducer configured to receive the amplified audio signal and to provide an acoustic signal based upon the amplified audio signal, and a memory configured to store the at least one audio setting and to store an association of the at least one audio setting with the identifier.

In various examples, the processor may be further configured to retrieve the at least one audio setting, based upon the identifier, from at least one of the memory or a remote device. The processor may assign the identifier to the audio content based at least in part upon metadata associated with the audio content.

In some examples, the speaker system may be a first speaker system and the processor is further configured to receive a request for the audio parameter from a second speaker system and in response to provide the audio parameter to the second speaker system.

In certain examples, the processor may be configured to assign the identifier to the audio content based at least in part upon the selected input from which the audio content is received.

In some examples, the at least one audio setting is at least one of an equalization parameter, a delay parameter, a sound level parameter, or a processing mode parameter. In some examples, the memory may be further configured to store an association of the at least one audio setting with a time of day.

According to another aspect, a non-transitory computer readable medium is provided having encoded instructions configured to cause a processor to perform a method that includes receiving audio program content from an audio source, receiving an audio parameter from a user interface, deriving an audio signal from the audio program content in accord with the audio parameter, assigning an identifier to the audio program content, storing the audio parameter, and associating the identifier with the stored audio parameter.

In some examples, the instructions are further configured to cause the processor to retrieve the stored audio parameter and derive the audio signal in accord with the retrieved audio parameter.

Certain examples also include instructions configured to cause the processor to detect metadata associated with the audio program content, and assign the identifier based upon the metadata.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to systems and methods of establishing audio reproduction parameters from stored parameters associated with a particular audio content or type, of establishing the stored parameters and associating them with the audio content or type, and of detecting the audio content or type so that stored associated parameters may be retrieved and applied in rendering the audio content.

Figure 1:
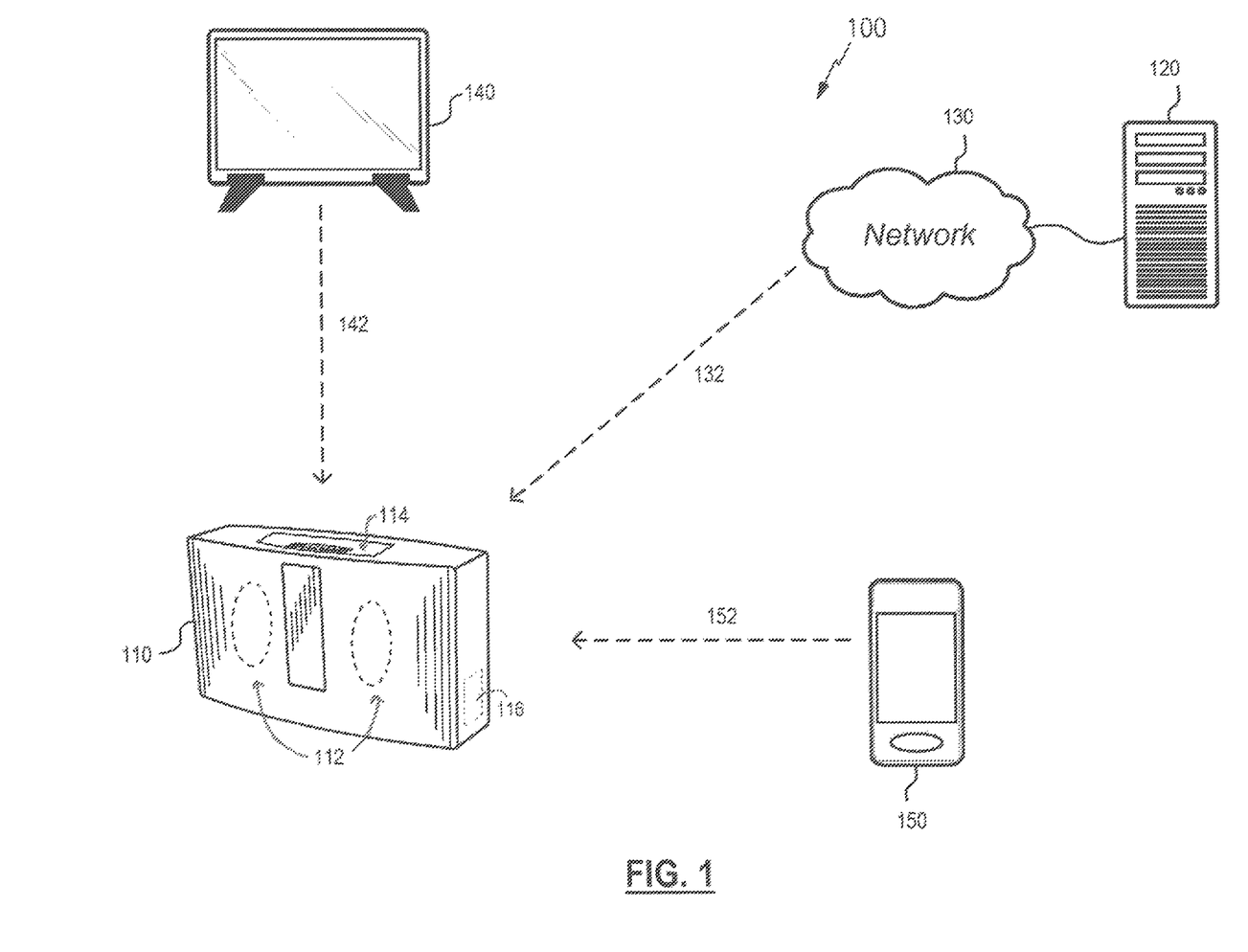
FIG. 1 is a schematic diagram of an example user environment.

FIG. 1 illustrates a user environment 100 including an audio device 110, such as a speaker system, and various audio sources, including a remote server 120 accessible via a network 130, a video display 140 (e.g., a television), and a portable device 150 (e.g., a smart phone). Numerous additional devices or systems may be audio sources as are known in the art. The audio device 110 reproduces audio program content from any of the audio sources by rendering audio program content into acoustic signals via one or more transducers 112. The audio device 110 also includes a user interface 114 to allow user input and output, such as displays, buttons, touch-sensitive panels, etc. so that a user may provide control inputs to, and receive information from, a controller 116 that controls the audio device 110. The audio device 110 may have various forms, such as a semi-portable tabletop speaker (as shown), or may be a larger more permanent fixed speaker, a smaller more portable speaker system, or may be or include a wearable speaker system, such as a headset, headphones, earphones, or other speaker system worn on or about the body, that provides one or more audio transducers 112.

The audio device 110 may receive audio program content from the audio sources in various forms or formats, such as analog or digital formats, and of various channels, such as mono, stereo, or multi-channel (e.g., surround), over various types of interfaces, wired or wireless. For example, the remote server 120 may provide an audio program content stream over the network 130, which may be received by the audio device 110 over a wi-fi interface 132. The video display 140 may provide audio program content over a near field wireless interface 142, such as a Bluetooth™ interface, for instance. Similarly, the portable device 150 may provide audio program content over a near field wireless interface 142, such as a Bluetooth™ interface. In various examples, multiple of the devices shown in FIG. 1, or others, may be involved in providing an audio program content stream to the audio device 110. For example, the portable device 150 may receive audio program content from the remote server 120 via a wireless connection to the network 130 (e.g., via wi-fi), or via another network (e.g., cellular), and provide the audio program content to the audio device 110 via the interface 152. Similarly, access to the network 130 may be via a wireless router (not shown).

In various examples, the audio device 110 may provide various audio processing to the audio program content prior to rendering the audio program content as an acoustic signal via the transducer(s) 112. Some audio processing may be user selectable or configurable while other audio processing may not. For example, tone selections (low-mid-high), equalization parameters, relative volume between channels (e.g., balance, fade, center, surround, room levels), overall volume, audio delay/sync (e.g., to align with video content), audio offsets (e.g., to boost a low signal level, such as a turntable input), and/or selectable modes (e.g., film, ambiance, dialog enhancement, etc.) may all be selectable, adjustable, or configurable by a user. Some settings may be internally selectable or adjustable without user input or without user control, such as equalization parameters that account for a frequency response of a transducer 112, for instance. Such internal settings or parameters, while not configurable by the user, may exhibit enhanced performance when adjusted (e.g., by the controller 116) for the nature or type of audio program content, such as spoken word, movie audio, music, and/or a type or genre of these.

TABLE 1

| Example Audio Reproduction Settings/Parameters |
|---|
| Speaker Equalization |
| Room Equalization |
| Program Equalization |
| Tone (Bass, Mid, Treble) |
| Video Sync, Delay |
| Balance, Fade |
| Multi-Channel Volume Offset |
| Center Channel Volume Offset |
| Rear Channel Volume Offset |
| Room Volume Offset |
| Pre-Amp/Signal Boost |
| Ambiance, Loudness |
| Custom Modes (e.g., dialog, theatre) (on/off/select) |

In various examples, the audio device 110 allows a user to make adjustments to audio settings, such as but not limited to the examples listed in Table 1, via the user interface 114. The audio device may apply the user settings to affect the reproduction of the audio program content. In certain examples, the audio device may detect a characteristic or an aspect of the audio program content, and may use a characterization or an explicit identifier to identify the type of audio content. For example, a software component may include a variable AUDIO_CONTENT_TYPE in which is stored an identifier associated with the audio program content, as described in more detail below. The audio device may store the user configured audio settings in memory, and may associate the set of audio settings with the audio program content identifier. In some examples, the audio device may also store internal audio settings, not configurable by the user, and associate them with the audio program content identifier. Additionally, an audio device may include stored default audio settings that may be associated with one or more audio content characteristic(s).

Users may change listening options at various intervals, and may change which audio program content is being reproduced at any time. When a user selects an audio program or type of audio content that he or she has previously selected, and for which the audio device has stored an identifier associated with the content type, the audio device may retrieve the set of audio settings associated with the audio program content identifier and may apply them to the current listening session.

Figure 2:
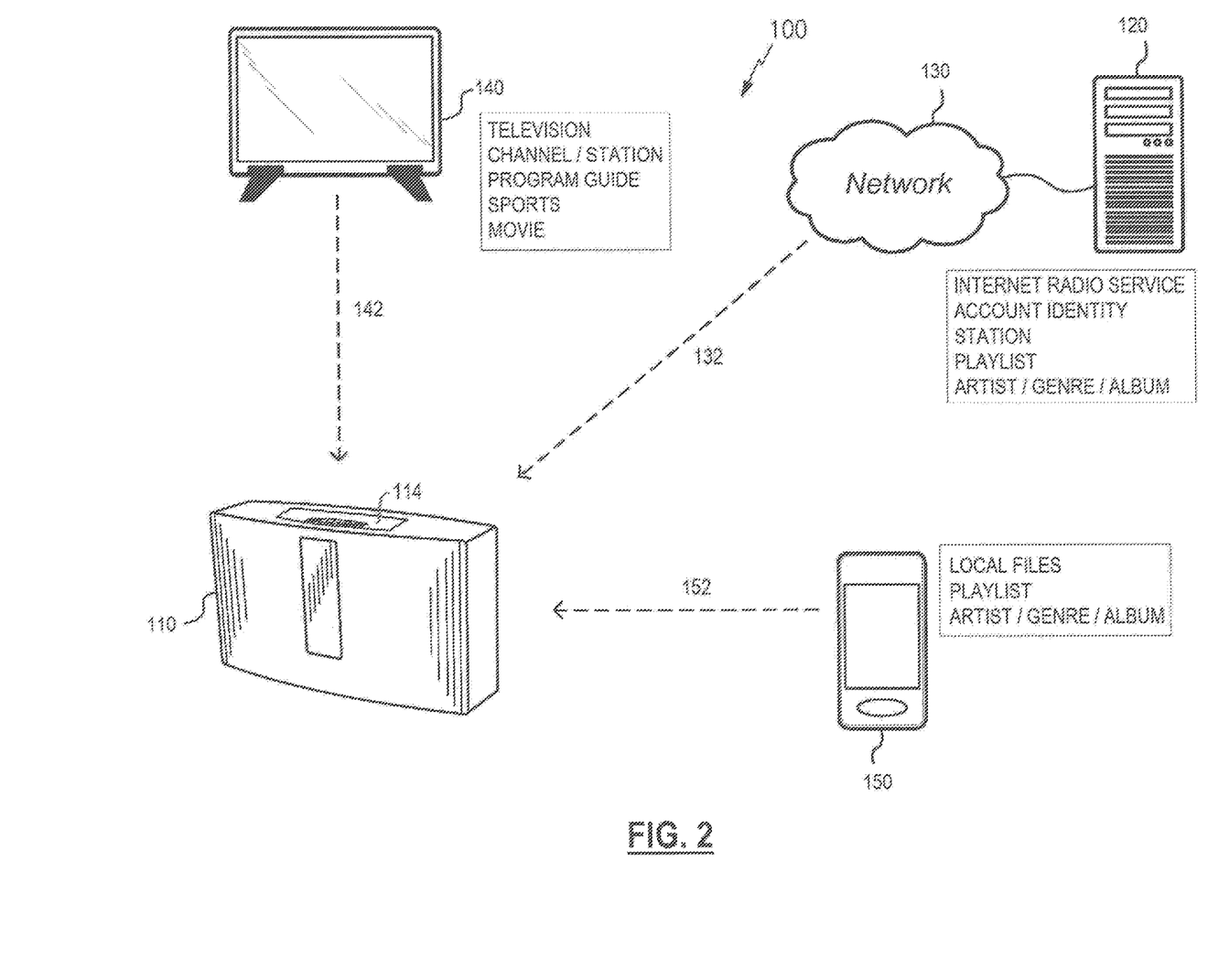
FIG. 2 is another schematic diagram of the example user environment.

With reference to FIG. 2, various examples of an audio device 110 may characterize or identify audio program content in various ways, e.g., by various identifiers or common characteristics, and may also detect the audio program content by various methods. For example, the remote server 120 may host a streaming audio service, and the audio device 110 may have access to information about the audio stream being provided, such as station name, program name, or playlist name, artist name, genre or other audio type identifiers, album name, etc. In some examples, the remote server may host a video streaming service, and similar names and identifiers may be available to the audio device (e.g., movie name, genre or type identifier, actor's name, etc.). The audio device 110 may have access to such information through various means. For example, the user's account on the remote server 120 may be controlled through the audio device 110, or the user's account may be controlled via another device (e.g., the portable device 150) that provides metadata to the audio device 110, or metadata may be provided from the remote server 120 along with the streamed content. In other examples, various data and/or identifiers regarding the audio program content being rendered by the audio device 110 may be provided in various other ways.

With continued reference to FIG. 2, the audio device 110 may at times reproduce audio content from other devices, such as the portable device 150 or a similar computing device (e.g., laptop, desktop computer, etc.). Such audio content may come from a remote streaming service, similar to that described above, and routed through the computing device, or may be local content on the computing device. Accordingly, various data and/or identifiers regarding the audio program content being rendered by the audio device 110 may be provided by the computing device. For example, the portable device 150 may provide audio from stored files and may provide information such as a playlist name, a file name, content name, or other metadata information such as artist name, genre, album name, and the like. Similarly, a video file may be displayed on the portable device 150 with accompanying audio content provided to the audio device 110, and similar metadata and/or identifiers may be provided to the audio device 110, such as video title, genre, various type identifier(s), etc.

With further reference to FIG. 2, the audio device 110 may at times reproduce audio content from other devices, such as the video display 140 or a similar video processing device (e.g., cable television receiver, video disc player, etc.). Accordingly, various data and/or identifiers regarding the audio program content being rendered by the audio device 110 may be provided by the video device. For example, a video device may receive and provide various metadata about video program content, such as from a program guide (e.g., through a set-top box), which may provide information about program name, type or genre (e.g., sports, talk show, drama, comedy, etc.), or other information that may be used by the audio device 110 as a content identifier with which to associate a set of audio settings. In some examples, a video device may provide audio from stored video files and may provide information such as video title, genre, and/or other various type identifier(s).

Various additional factors may be correlated and used to identify a program content type and/or to create distinct associations of audio settings with particular content types. For example, two users may have identically named stations on a streaming service, but the stations may not be identical, and accordingly the audio device may associate different audio settings with a station name based further upon the user identity. Alternately, the audio device may incorporate the user identity into a content type identifier, such that the two identically named stations have different identifiers stored in memory by the audio device. In a further example, day, date, and/or time of day may factor into an association of audio settings with a program content type. For example, a user may listen to the same streaming station at different times of day but with different audio settings, e.g., due to different moods in the morning versus the afternoon, for instance. Similarly, a program content may be identified by a television channel, for instance, and weekday mornings may always be news programs on the identified channel, for which the user has a first set of preferred audio settings, while the same channel has sporting events on Saturday afternoons. Accordingly, the audio device may use a first program content type identifier for weekday morning broadcasts on the given channel and a second program content type identifier for Saturday broadcasts on the given channel. Alternatively or additionally, the audio device may use a single content type identifier for the given channel but associate a different set of audio settings at different days and times.

Figure 3:
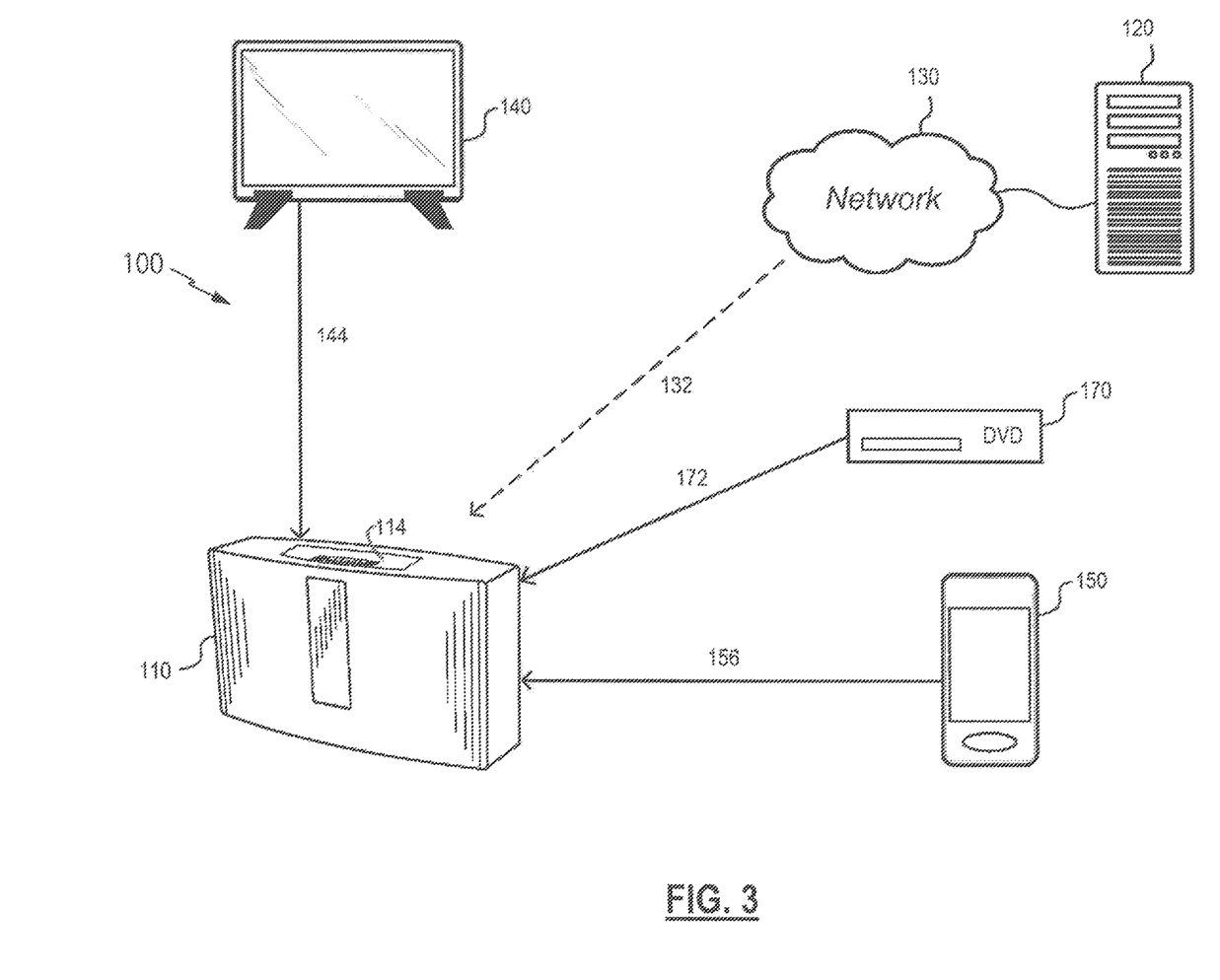
FIG. 3 is a schematic diagram of another example user environment.

In some examples, physical factors may be used to correlate and identify program content. For example, and with reference to FIG. 3, various devices may be physically connected to the audio device 110, e.g., by wired interfaces to physical connectors associated with the audio device 110. As shown in FIG. 3, the video display 140 may be connected to a first wired audio interface 144, the portable device 150 may be connected to another wired interface 156, and a video device 170 may be connected to yet another wired interface 172. Selection of any of the interfaces by a user may be used for or as a content type identification. For example, the user may adjust audio settings a certain way when listening to an INPUT_1, and may adjust the audio settings a different way when listening to INPUT_2. The audio device may store a set of audio settings with an association to INPUT_1, and likewise different audio settings with an association to INPUT_2, and may apply the associated set of audio settings whenever each physical input is selected. In various examples, similar association of an "input" may be made with wireless or otherwise "virtual" connections or interfaces. For example, with reference to FIG. 2, selection of audio content from the interface 142 may be identified differently from selection of audio content form the interface 152, though each of the interfaces 142, 152 may be instantiated via a single physical interface (e.g., a Bluetooth™ or other wireless radio).

In some examples, a sample of the audio program content may be analyzed, characterized, or fingerprinted to detect an aspect of the audio program content. Analysis of a sample of audio program content may include sending the sample to a remote service for processing. For example, an audio sample may be sent by the audio device 110 across the network 130 to a remote service (not shown) that analyzes the sample and responds to the audio device 110 by communicating song title, artist, album, or similar information.

Table 2 lists various distinguishing identifiers, characteristics, and/or information sources, without limitation, that an audio device may use to detect, identify, or otherwise distinguish audio program content for association with audio settings, in accord with various aspects and examples herein. An actual "type" of program content need not be accurate in any particular sense. For example, a program content identifier may be sufficient to associate a set of audio settings, which may reflect a user's preferences for similar audio content, without any affiliation to a human-interpreted concept of "type."

TABLE 2

Example Program Content/Identification Sources

Station Title/Identifier
Playlist Title/Identifier
Source Identifier/User Account Identifier
Album/Artist/Genre Descriptors
Video Program Title/Genre Descriptors
Movie Title/Genre Descriptors
Track Name/Number
Chapter Name/Number
Content File Metadata (Title, Genre, etc)
Source Input (Connection/Interface)
Audio Sample (Analyze, Characterize, Fingerprint)
Audio Sample (Metadata Service, e.g., Soundhound, Spotify)
User Configurable Information (Cable Provider, Zip Code)
User Configurable Information (Source Input Data/Type)
Embedded Metadata (Content Stream, e.g., HDMI, BT Profile)
User Profile/User Interface
Time of Day In certain examples, the audio device 110 may characterize how often and/or to what degree a user makes audio adjustments when listening to an identified program content, and may "learn" or variously characterize the user's habits for the identified program content. For example, the time of day adjustments described previously may be a learned association of user habit, and may apply to a particular identified program content or may apply to all program content. Accordingly, if a user makes consistent adjustments to audio settings, such may be learned and applied based on some criteria of the user's consistent behavior. Alternately, if a user often makes significant and inconsistent changes to the audio settings while listening to an identified program content, the audio device 110 may determine that there is not a set of audio settings consistently appropriate for the particular identified program content, and may accordingly discard the particular identification of that program content, or may store a default set of nominal audio settings to be associated with the particular identified program content, and/or may store a flag to indicate that the stored set of audio settings should not be updated based on user adjustment. In some examples, the audio device may update the set of stored audio settings only when the user consistently makes a similar adjustment each time the user selects the particular identified program content.

In various examples, the audio device 110 may learn from the behavior of other users and/or from a single user's behavior in relation to another audio device 110. A certain user may interact with more than one audio device 110, and the various audio devices 110 may share content type identification information and may share stored sets of audio settings. Further, an audio device 110 may communicate with a crowd-sourced data storage of learned common audio settings or adjustments, which may be managed by a manufacturer or a metadata service provider, for instance. For example, across a number of audio devices like the audio device 110, it may be learned that bass levels are commonly increased when listening to a particular streaming station, or when listening to a particular album, for instance, and the audio device 110 may establish a stored audio setting that similarly increases bass levels when the local user selects the particular streaming station or album. Alternately or additionally, the audio device 110 may make suggestions to the user as to common audio settings or adjustments, such as suggesting an increased bass level when streaming the particular station, for example, or suggesting alternate equalization settings, sound processing modes, etc.

In various examples, some audio settings may persist only while the user is listening to an identified program content, may apply to a group or range of identified program content, or may be global, e.g., applied persistently without regard for a selected audio program content. In some examples, the level of persistence of one or more audio settings may be selectable or configurable by the user.

In various examples, an audio device 110 may include or may be incorporated with other devices and components and may include additional rendering components and capabilities. For example, the audio device 110 may include a video display, similar to the video display 140, without departing from the aspects and examples described herein. An audio device 110 in accord with aspects and examples described herein may be incorporated into a television set, a computer, a telephone, or other devices, for instance.

Figure 4:
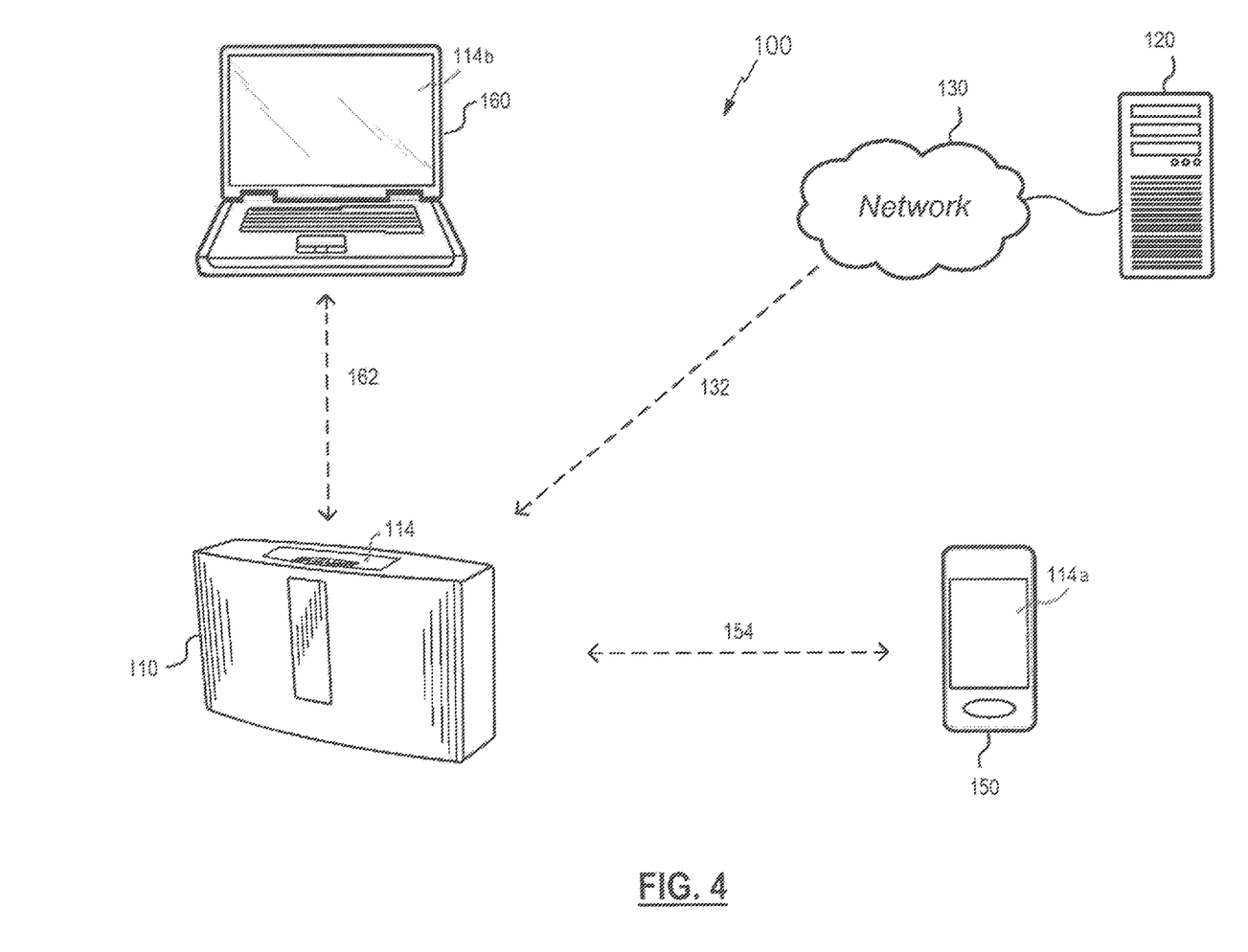
FIG. 4 is a schematic diagram of another example user environment.

In various examples, a user interface (for interaction with the controller 116, see FIG. 1) may include remote portions. With reference to FIG. 4, the portable device 150 may include a software application providing a user interface 114a that provides some or all of the functionality of the user interface 114, and may be provided in addition to or instead of the user interface 114. An interface 154 may allow for communication of user controls, commands, and/or adjustments to audio settings, and may be the same or ancillary to the interface 152 discussed above for the communication of audio program content. Other examples of remote portions of a user interface include, but are not limited to, a computer 160 that may include a software application providing a user interface 114b that provides some or all of the functionality of the user interface 114 and/or the user interface 114a, and may be provided in addition to or instead of the user interfaces 114, 114a. An interface 162 may allow for communication of user controls, commands, and/or adjustments to audio settings, and may also support audio program content from the computer 160. Other examples of remote user interfaces include remote controls, e.g., using infrared and/or radio frequency wireless signals, wired remotes, alternate computing devices, etc.

Figure 5:
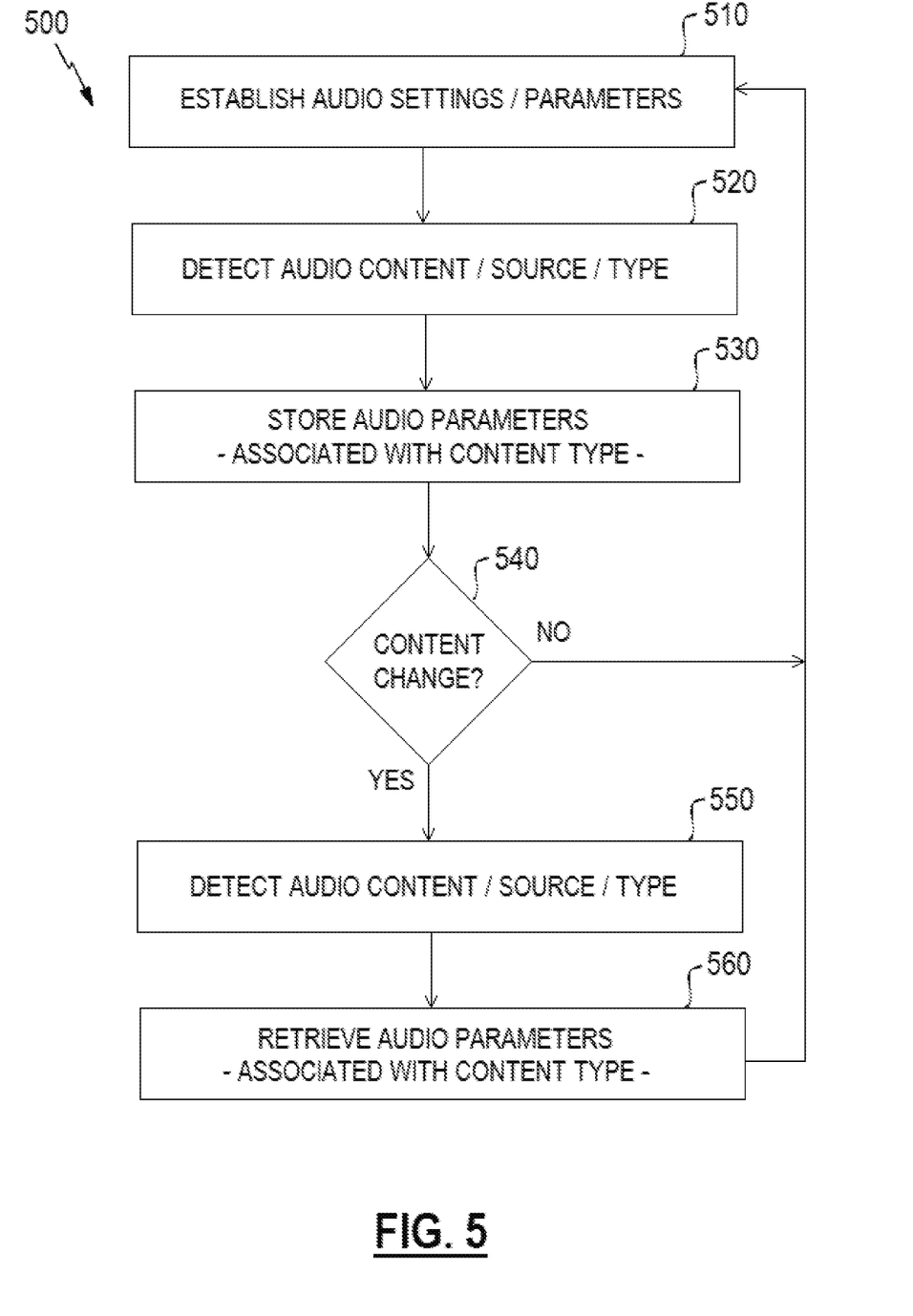
FIG. 5 is a flow diagram of an example methodology.

FIG. 5 illustrates an example method 500 that may be implemented by the audio device 110 (or the controller 116) in various examples. The audio device 110 may establish various audio parameters (block 510), which may be established, modified, or adjusted by a user at various intervals, during audio reproduction. The audio device 110 may detect the audio content type (block 520) through various means, as described above, and may store the audio parameters in memory, associated with the detected content type (block 530). Whenever the user selects a different audio content (block 540), the audio device 110 may detect the (new) audio content type (block 550) and retrieve audio parameters (block 560) that were previously stored and associated with the (new) detected content type. Finally, the audio device 110 may establish (block 510) the retrieved audio parameters for use in rendering the (new) audio content.

Any of various functions described, including those of the example method 500 or similar, and any components of an audio device, such as the audio device 110, and its controller, e.g., the controller 116, or similar, may be implemented or carried out with use of a microprocessor, a logic controller, logic circuits, a digital signal processor (DSP), or the like, or any combination of these, and may include analog circuit components, digital circuit components, and/or other components with respect to any particular implementation. Any suitable hardware and/or software, including firmware and the like, may be configured to carry out or implement components of the aspects and examples disclosed herein, and various implementations of aspects and examples may include components and/or functionality in addition to those disclosed. Additionally, statements herein that an audio device does or takes an action may be understood to mean that a controller of the audio device may do or take the action.

Figure 6:
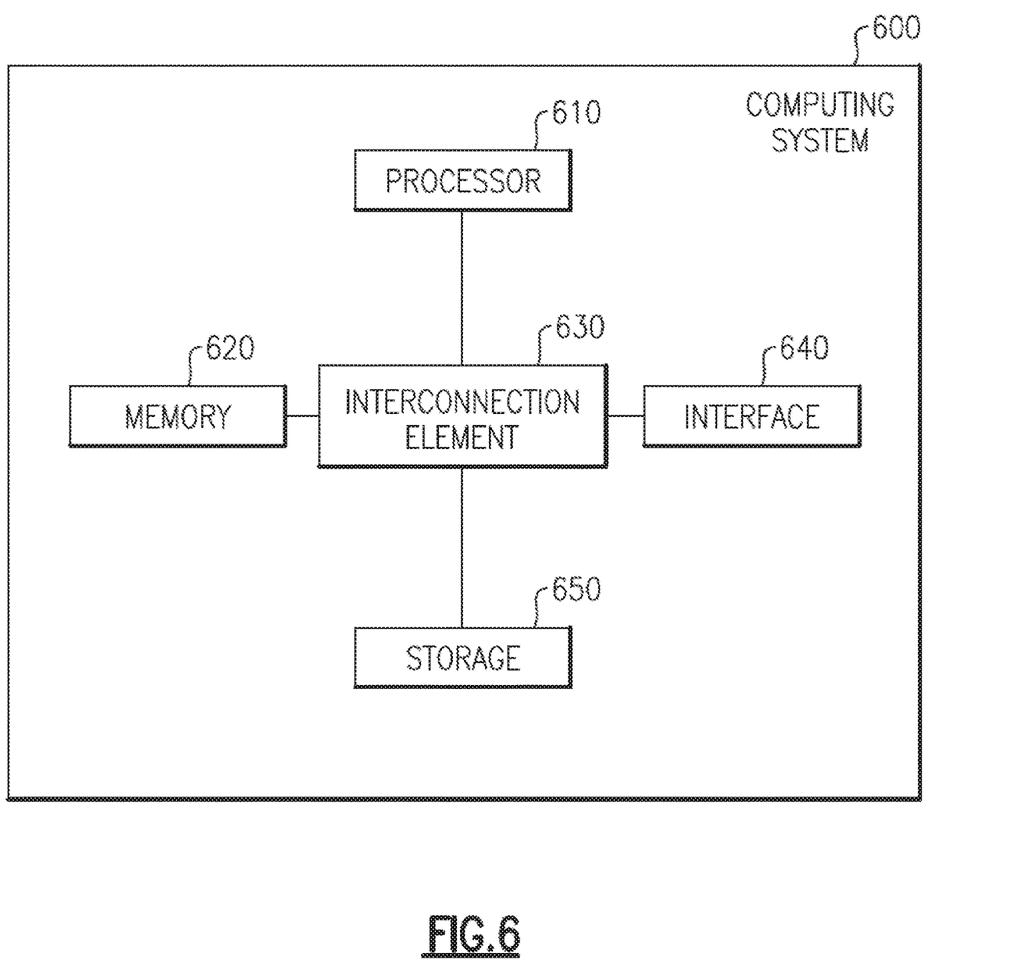
FIG. 6 is a schematic diagram of an example computing system.

Referring to FIG. 6, there is illustrated a block diagram of a computing system 600, in which various aspects and functions may be practiced. As illustrated in FIG. 6, at least one computing system 600 includes a processor 610, a memory 620, an interconnection element 630, an interface 640 and a data storage element 650. To implement at least some of the aspects, functions, and processes disclosed herein, the processor 610 performs a series of instructions that result in manipulated data. The processor 610 may be any type of processor, multiprocessor, controller, field programmable gate array (FPGA), application specific integrated circuit (ASIC), or digital signal processor (DSP). The processor 610 is connected to other system components, including one or more memory 620 devices, by the interconnection element 630.

The memory 620 may store one or more programs (e.g., sequences of instructions coded to be executable by the processor 610) and/or data, which may include device identifiers and bonded keys, for example, during operation of the computing system 600. Thus, the memory 620 may be a relatively high performance, volatile, random access memory 620 such as a dynamic random access memory 620 ("DRAM") or static memory 620 ("SRAM"). However, the memory 620 may include any device for storing data, such as a disk drive or other nonvolatile storage device.

Components of the computing system 600 are coupled by an interconnection element 630. The interconnection element 630 may include any communication coupling between system components such as one or more physical busses in conformance with specialized or standard computing bus technologies or interfaces, and may include differing technologies to couple to different components. The interconnection element 630 enables communications, including instructions and data, to be exchanged between system components of the computing system 600.

The computing system 600 may include one or more interface 640 devices such as input devices, output devices and combination input/output devices. Interface 640 devices may receive input or provide output. More particularly, output devices may render information for external presentation. Input devices may accept information from external sources. Examples of interface 640 devices include keyboards, mouse devices, trackballs, microphones, touch screens, printing devices, display screens, speakers, network interface cards, storage devices, etc. Interface 640 devices allow the computing system 600 to exchange information and to communicate with external entities, such as users and other systems.

The data storage element 650 includes a computer readable and writeable nonvolatile, or non-transitory, data storage medium in which instructions may be stored that define a program, or other object, that is executed by the processor 610. The data storage element 650 also may include information that is recorded, on or in, the medium, such as device identifiers and bonded keys, for example, and processed by the processor 610 during execution of one or more programs. More specifically, the information may be stored in one or more data structures specifically configured to conserve storage space or increase data exchange performance. The instructions may be persistently stored as encoded signals, and instructions may cause the processor 610 to perform any of the functions described herein. The medium may, for example, be optical disk, magnetic disk or flash memory 620, among others. In operation, the processor 610 or some other controller causes data to be read from the storage element 650 into another memory, such as the memory 620, that allows for faster access to the information by the processor 610 than does the storage medium included in the data storage element 650. A variety of components may manage data movement between the storage element 650 and other memory elements and examples are not limited to particular data management components. Further, examples are not limited to a particular memory system or data storage system.

Although the computing system 600 is shown by way of example as one type of computing system 600 upon which various aspects and functions may be practiced, aspects and functions are not limited to being implemented on the computing system 600 as shown in FIG. 6. Various aspects and functions may be practiced on one or more computers having different architectures or components than that shown in FIG. 6. For instance, the computing system 600 may include specially programmed, special-purpose hardware, such as an application-specific integrated circuit ("ASIC") tailored to perform a particular operation disclosed herein. Another example may perform the same operation using a grid of several computing devices running operating systems with various processors and/or several specialized computing devices running proprietary hardware and operating systems.

The computing system 600 may be a computing system 600 including an operating system that manages at least a portion of the hardware elements included in the computing system 600. In some examples, a processor or controller, such as the processor 610, executes an operating system. In other examples the processor 610 may include other forms of logic, such as an ASIC, FPGA, or DSP, and may have other forms of instruction sets, and may or may not execute an operating system.

In some examples, the components disclosed herein may read parameters that affect the functions performed by the components. These parameters may be physically stored in any form of suitable memory including volatile memory (such as RAM) or nonvolatile memory (such as flash memory). In addition, the parameters may be logically stored in a proprietary data structure (such as a database or file defined by an application) or in a commonly shared data structure (such as an application registry that is defined by an operating system). In addition, some examples provide for both system and user interfaces that allow external entities to modify the parameters and thereby configure the behavior of the components.

Various examples of the methods and apparatuses discussed herein are not limited in application to the details of construction and the arrangement of components set forth in the above descriptions or illustrated in the accompanying drawings. The methods and apparatuses are capable of implementation in various embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An audio processing system, comprising:
   at least one audio input configured to receive at least one of a first audio program content and a second audio program content, wherein a user can select a selected audio program content from the at least one of the first audio program content and the second audio program content;
   a controller configured to store at least one audio parameter related to the selected audio program content, to assign a respective identifier to the selected audio program content, and to associate the stored at least one audio parameter with the respective identifier; and
   an audio transducer configured to convert an audio signal into an acoustic signal, the audio signal being derived from the selected audio program content in accord with the at least one audio parameter,
   wherein the at least one audio parameter includes at least one of an equalization parameter, a delay parameter, a tone parameter, a balance parameter, a fade parameter, a multi-channel volume offset, a center channel volume offset, or a rear channel volume offset,
   wherein the controller is further configured to associate a user identity with the respective identifier such that a first user identity is incorporated into a first identifier assigned to the selected audio program content and a second user identity is incorporated into a second identifier assigned to the selected audio program content, and
   wherein, when a user selects between the first audio program content and the second audio program content during a listening session, the controller is configured to use the respective identifier to retrieve the at least one audio parameter that is associated with the respective identifier that is associated with the respective user identity, and to apply the retrieved at least one audio parameter to the listening session.

2. The audio processing system of claim 1 wherein the controller is configured to detect the at least one audio input, and assign the respective identifier to the selected audio program content based upon the at least one audio input.

3. The audio processing system of claim 1 wherein the controller is configured to detect metadata associated with the selected audio program content, and to assign the respective identifier based upon the metadata.

4. The audio processing system of claim 3 wherein the metadata includes at least one of a playlist title, a station title, a program title, a genre, an album title, an artist title, a song title, a track name, a track number, a chapter name, a chapter number, or a file name.

5. The audio processing system of claim 3 wherein the controller is configured to extract the metadata from a channel of the selected audio program content.

6. The audio processing system of claim 3 wherein the metadata is provided by a source of the selected audio program content.

7. The audio processing system of claim 3 wherein the controller is configured to detect the metadata at least in part through analysis of the selected audio program content.

8. The audio processing system of claim 1 wherein the at least one audio parameter further includes at least one of a sound level parameter or a processing mode parameter.

9. A speaker system, comprising:
   a plurality of selectable inputs configured to receive a respective audio content;
   a processor configured to process the audio content according to at least one audio setting and configured to assign a respective identifier to the audio content;
   an amplifier configured to amplify the processed audio content and to provide an amplified audio signal;
   an acoustic transducer configured to receive the amplified audio signal and to provide an acoustic signal based upon the amplified audio signal; and
   a memory configured to store the at least one audio setting and to store an association of the at least one audio setting with the respective identifier,
   wherein the at least one audio setting includes at least one of an equalization parameter, a delay parameter, a tone parameter, a balance parameter, a fade parameter, a multi-channel volume offset, a center channel volume offset, or a rear channel volume offset,
   wherein the processor is further configured to associate a user identity with the respective identifier such that a first user identity is incorporated into a first identifier assigned to the audio content and a second user identity is incorporated into a second identifier assigned to the audio content, and
   wherein, when a user selects one of the plurality of selectable inputs during a listening session, the processor is configured to retrieve the at least one audio setting that is associated with the respective identifier that is associated with the respective user identity, and to apply the retrieved at least one audio setting to the listening session.

10. The speaker system of claim 9 wherein the processor is further configured to assign the respective identifier to the audio content based at least in part upon a selected input of the plurality of selectable inputs from which the audio content is received.

11. The speaker system of claim 9 wherein the at least one audio setting further includes at least one of a sound level parameter or a processing mode parameter.

12. The speaker system of claim 9 wherein the memory is further configured to store an association of the at least one audio setting with a time of day.

13. The speaker system of claim 9 wherein the processor is further configured to retrieve the at least one audio setting from at least one of the memory or a remote device.

14. The speaker system of claim 13 wherein the processor is further configured to assign the respective identifier to the audio content based at least in part upon metadata associated with the audio content.

15. A speaker system comprising:
a plurality of selectable inputs configured to receive audio content;
a processor configured to process the audio content according to at least one audio setting and configured to assign an identifier to the audio content;
an amplifier configured to amplify the processed audio content and to provide an amplified audio signal;
an acoustic transducer configured to receive the amplified audio signal and to provide an acoustic signal based upon the amplified audio signal; and
a memory configured to store the at least one audio setting and to store an association of the at least one audio setting with the identifier,
wherein the processor is further configured to retrieve the at least one audio setting, based upon the identifier, from at least one of the memory or a remote device,
wherein the processor is further configured to assign the identifier to the audio content based at least in part upon metadata associated with the audio content, and
wherein the speaker system is a first speaker system and the processor is further configured to receive a request for the at least one audio setting from a second speaker system and in response to provide the at least one audio setting to the second speaker system.

16. A non-transitory computer readable medium having encoded instructions configured to cause a processor to perform a method, the method comprising:
receiving at least one of a first audio program content and a second audio program content from an audio source, wherein a user can select a selected audio program content from the at least one of the first audio program content and the second audio program content;
receiving an audio parameter from a user interface;
deriving an audio signal from the selected audio program content in accord with the audio parameter;
assigning a respective identifier to the selected audio program content, and associating a user identity with the respective identifier such that a first user identity may be incorporated into a first identifier assigned to the selected audio program content and a second user identity may be incorporated into a second identifier assigned to the selected audio program content;
storing the audio parameter;
associating the respective identifier with the stored audio parameter; and
in response to a user selecting between the first audio program content and the second audio program content during a listening session, causing the processor to retrieve the stored audio parameter that is associated with the respective identifier that is associated with the respective user identity and derive the audio signal in accord with the retrieved audio parameter,
wherein the audio parameter includes at least one of an equalization parameter, a delay parameter, a tone parameter, a balance parameter, a fade parameter, a multi-channel volume offset, a center channel volume offset, or a rear channel volume offset.

17. The non-transitory computer readable medium of claim 16 further having encoded instructions configured to cause the processor to detect metadata associated with the selected audio program content, and assign the respective identifier based upon the metadata.

* * * * *